United States Patent [19]

Lee

[11] Patent Number: 5,452,650
[45] Date of Patent: Sep. 26, 1995

[54] JUICE EXTRACTOR

[76] Inventor: Mun-Hyon Lee, 17/3, 47-2 Sajik 1-dong, Dongrae-ku Pusan, Rep. of Korea

[21] Appl. No.: 363,755

[22] Filed: Dec. 23, 1994

[30] Foreign Application Priority Data

Dec. 24, 1993 [KR] Rep. of Korea .................. 1993-29381

[51] Int. Cl.$^6$ .............................. A23N 1/00; A23N 1/02; A23L 1/212; A23L 2/06
[52] U.S. Cl. ..................... 99/510; 99/495; 99/513; 241/101.2; 241/260.1; 241/261; 366/272; 366/291; 366/299; 366/300
[58] Field of Search .................. 99/495, 509–513, 99/348; 100/37, 53, 98 R, 117, 145, 121; 241/92, 101.1, 101.2, 260.1, 261; 366/83–85, 272, 297, 301, 318, 291, 299–301

[56] References Cited

U.S. PATENT DOCUMENTS

| | | | |
|---|---|---|---|
| 3,533,563 | 10/1970 | Eriksson | 241/261 |
| 3,799,522 | 12/1973 | Loomans | 366/85 |
| 4,025,056 | 5/1977 | Miles et al. | 366/272 |
| 4,073,013 | 2/1978 | Blach | 366/301 |
| 4,643,085 | 2/1987 | Bertocchi | 99/510 |
| 4,774,097 | 9/1988 | Bushman et al. | 426/489 |
| 4,792,294 | 12/1988 | Mowli | 366/85 |
| 4,844,350 | 7/1989 | Larsson | 241/261 |
| 4,846,054 | 7/1989 | Mange et al. | 99/495 |
| 5,156,872 | 10/1992 | Lee | 99/510 |
| 5,381,730 | 1/1995 | Kim | 99/510 |

Primary Examiner—Timothy F. Simone
Attorney, Agent, or Firm—Koda and Androlia

[57] ABSTRACT

A juicer or a juice extractor having a vertically-arranged grinding chamber and compression chamber. The material to be ground into juice is first ground in the grinding chamber and then compressed in the compression chamber by a pair of Archimedes' screws; and in this case, the direction of movement of the material in the compression chamber is designed so as to be opposite to that in the grinding chamber.

7 Claims, 3 Drawing Sheets

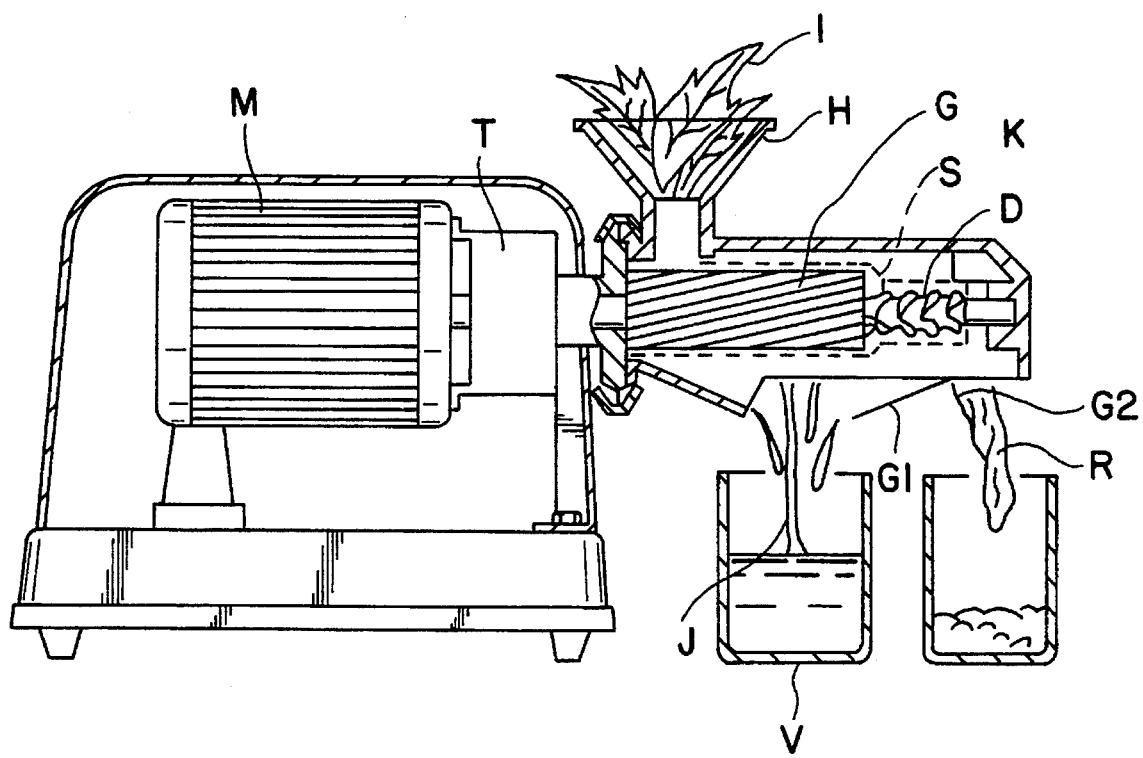
FIG. IA
PRIOR ART
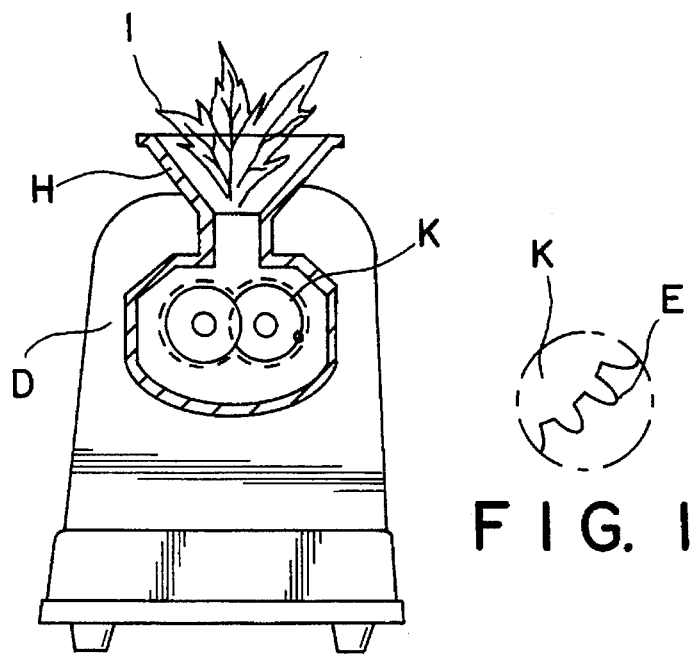
FIG. IB-1
PRIOR ART
FIG. IB-2

JUICE EXTRACTOR

BACKGROUND OF THE INVENTION

1. Field of the Invention

The present invention relates to a juice extractor or a juicer and more particularly to a juicer in which material is ground up and then compressed so that the juice is extracted.

2. Prior Art

A juicer is a device which extracts juice from various vegetables, tubers, and fruits. In the past, juicers used to extract juice were mainly of the centrifuge type, and a squeezing-type juicer was first proposed by the inventor of the present applicant in Korean Application Number for Utility Model Registration No. 86-17672.

Conventional juicers using the centrifugation method are suitable for extracting juice from fruit. But in the case of food items such as vegetables and tubers which have a large amount of fiber and a low water content, when these materials are sliced, the rate of juice extraction is not very high even at a considerably high rotation speed, and there is the problem of discharge of residual heavy metals from the food items with the juice.

To the contrary, in the juicer proposed by the inventor, i.e., a squeezing-type juicer, vegetables are sliced and compressed, but as squeezing is carried out simultaneously with slicing in order to extract the juice, the juice extraction rate is several times higher than that of centrifugation-type devices, and this type of unit has the advantage of preventing residual heavy metals from flowing out together with the juice. These squeezing-type juicers account for virtually all of the current market demand for juicers.

FIG. 1 shows a completed juicer devised and developed by the inventor disclosed in the Korean Utility Model Registration No. 59191.

In FIGS. 1A and 1B, by means of a drive gear group T connected a drive motor M, a pair of mutually interlocking rotating grinders K are used to grind material I inserted through a hopper H, and when the inserted material is transferred to a juice-squeezing net D, the squeezed juice J drops into a receptacle V along a juice guide G1, and the residue R is discharged via a residue guide G2.

However, compared to low-load, high-revolution-speed centrifuge-type juicers, when the grinding gear K grinds the inserted material I and the juice is squeezed out on the side of the juice-squeezing net D, the above-described type of juicer takes on the characteristics of a high load, low-revolution speed juicer. Accordingly, the drive motor M must handle an extremely high torque, and the speed reduction rate of the drive gear group T must also be increased to a considerable extent, so the drive motor M and the drive gear group T must be comparatively large in size. This makes the juicer large, with a weight of over 10 kg, resulting in a certain degree of inconvenience in moving and using such a heavy device.

Moreover, in grinding of the inserted substance by the pair of grinding gears K, as the functions of the grinding and/or compressing device are carried out simultaneously, a high degree of precision is required in designing and manufacturing the teeth of the pair of mutually interlocking grinding gears K used in this device. More specifically, one grinding gear K is equipped with a grinding component G in the form of a helical gear and a moving component S in the form of an Archimedes' screw, and it must be designed and manufactured so as to be capable of carrying out grinding and transporting/compressing of the material simultaneously, which is troublesome, making it difficult to achieve the optimum drive conditions for grinding and compressing.

Because the juicer is designed so that the grinding gear K grinds the inserted material I and squeezing is carried out by the juice-squeezing net D, the squeezing net D must be precisely manufactured, and the squeezing net D used is composed of thin porous plates, making handling and washing extremely difficult.

In order to solve these problems, the inventor of the present application proposed a juicer as shown in FIG. 2. This device was disclosed in the Korean Utility Model Registration Application No. 93-15905 which was filed on Aug. 18, 1993.

As shown in FIG. 2, respective vertically-aligned grinding C1 and compression chambers C2 contain a pair of helical gears 11 driven by drive axles S1 and S2 which are separate from the drive motor M, as well as a drive gear group T and an Archimedes' screw 12. The grinding chamber C1 and the compression chamber C2 are connected to or communicate with each other via a passage C3. Thus, the material inserted into the hopper H is ground by the helical gear 11 in the grinding chamber C1 and then drops via the passage C3 into the compression chamber C2, where it is discharged by the Archimedes' screw 12. Moreover, as compression is carried out by means of the regulating device for controlling the squeezing force 13, the juice is discharged via the juice-squeezing outlet 14, and the residue is discharged via the discharge passage 15.

In this type of vertically-aligned juicer, however, the compression chamber C2 begins at the bottom of the grinding chamber C1 accordingly, the required length of the gear housing makes the juicer unavoidably long, and the drive axle of the Archimedes' screw 12 also needs to have a long extending section 12a which protrudes to a considerable degree from the drive gear group T. Thus, the result is a decrease in the drive efficiency in the event of a strong vibration.

SUMMARY OF THE INVENTION

Accordingly, the object of the present invention is to provide a juicer which overcomes the difficulties associated with conventional vertically-aligned units, making the juicer more compact and improving the drive efficiency.

In order to accomplish the object, the juice extractor or a juicer of the present invention includes a grinding chamber containing a helical gear in which the inserted material is crushed and a compression chamber featuring an Archimedes' screw which is connected to said grinding chamber via a passage, and the characteristic feature is that the direction of movement of the material transported by the Archimedes' screw in the compression chamber is opposite to that of the helical gear in the grinding chamber.

In the arrangement described above, the spiral thread of the Archimedes' screw may be designed with a direction that is opposite to that of conventional devices, or it may rotate in reverse, causing the material introduced through the hopper to follow a U-shaped path as juicing is carried out.

BRIEF DESCRIPTION OF THE DRAWINGS

FIGS. 1A and 1B respectively show lateral and front views of a prior art juicer that has been registered in Korea by the inventor of the present application;

DETAILED DESCRIPTION OF THE INVENTION

The following is a detailed description of a preferred practical embodiment of the present invention with reference to the attached drawings.

Figure 3:
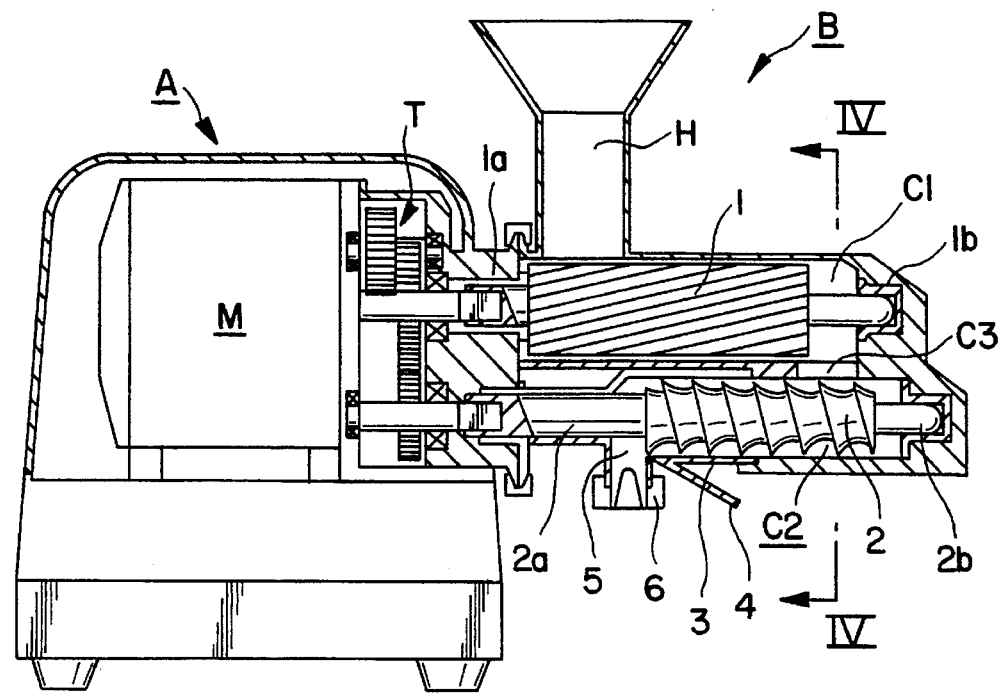
FIG. 3 is a side view showing the composition of the juicer of the present invention.
Figure 4:
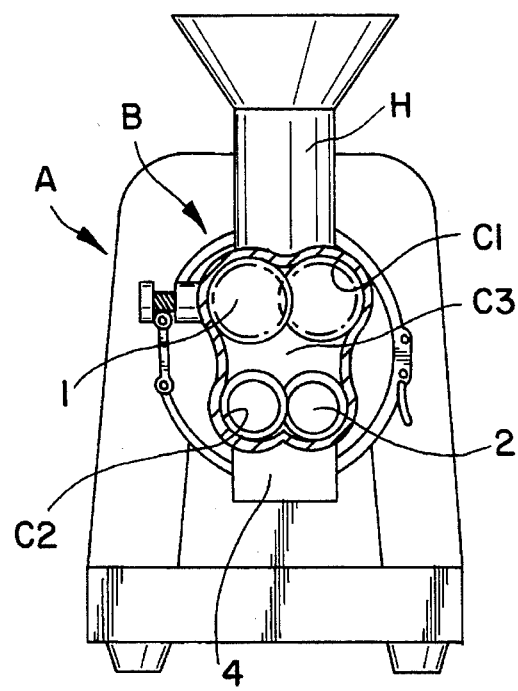
FIG. 4 is a sectional view of the juicer taken along the line IV—IV in FIG. 3.

In FIGS. 3 and 4, a gear housing B, which is structurally designed so as to grind and compress the inserted material, is joined in a detachable manner to the main body A, which is equipped with a drive motor M, drive gear group (or gear chain) T, and the regulating device.

A hopper H into which material is inserted is installed next to the gear housing B, and a grinding chamber C1 containing a pair of helical gears 1 which grind the inserted material is located at the bottom of this hopper. On one side of the helical gears 1, a drive axle 1a is connected to the drive gear group T of the gear housing B in a rotating manner, and a rotary axle 1b which comprises a rotating support with respect to the gear housing B is installed on the other side.

A passage C3 is located at the bottom of the grinding chamber, i.e., on the rotary axle 1b side of the helical gears 1. The passage C3 connects the grinding chamber C1 to a compression chamber C2 so that the grinding chamber C1 and the compression chamber C2 communicate with each other. The grinding chamber C1 and the compression chamber C2 are vertically aligned so that the grinding chamber C1 sits on the compression chamber C2.

On one side of the compression chamber C2, the drive axle 2a is connected in a rotating manner to the drive gear group T and on the other side, there is an Archimedes' screw 2, with the rotary axle 2b comprising a rotating support with respect to the gear housing B. One Archimedes' screw is sufficient, but the described embodiment features an interlocking pair of screws in order to improve the force of movement of the device.

Figure 2:
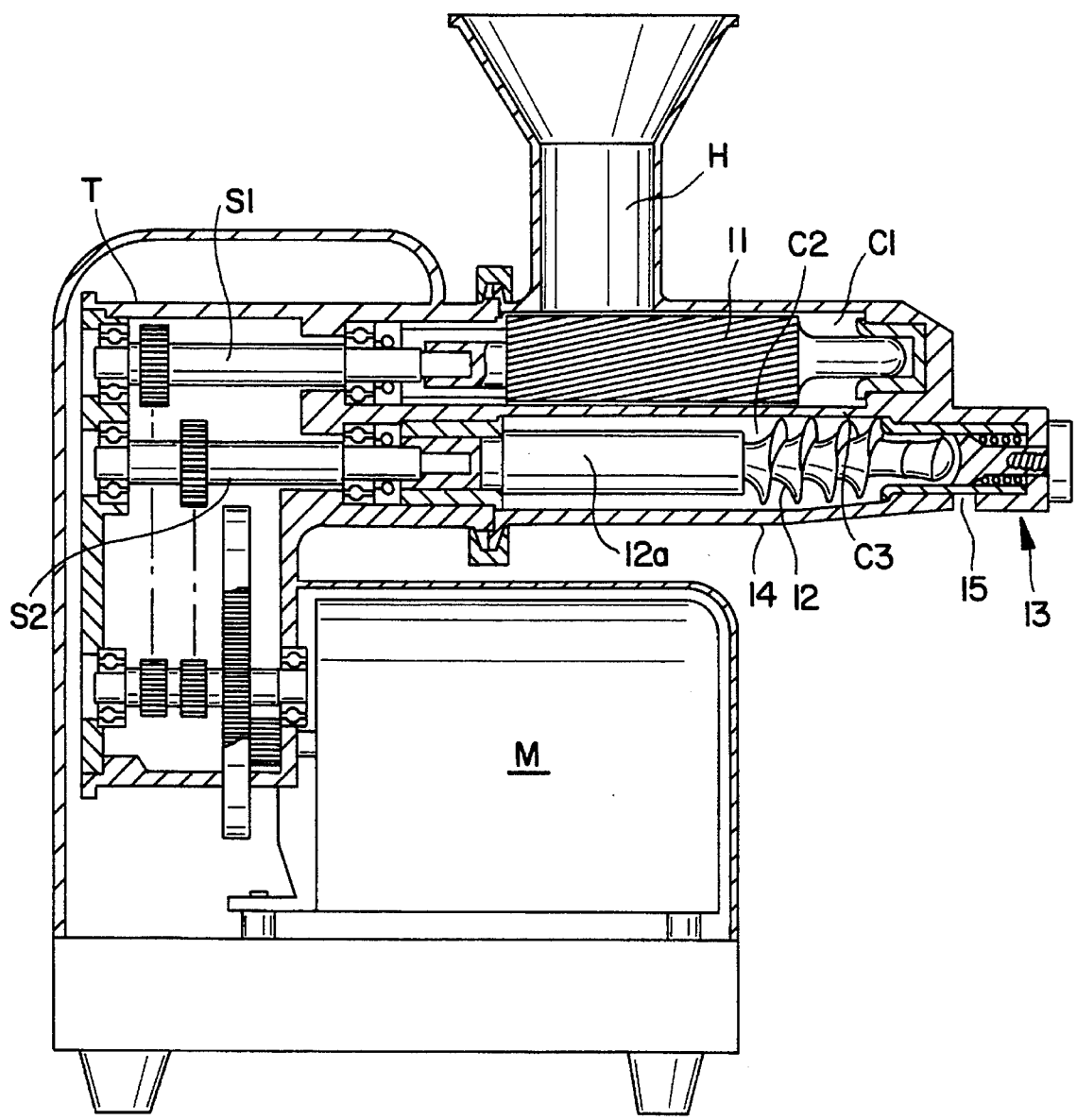
FIG. 2 is a diagram of another juicer of the inventor.

The special characteristic of the device of the present invention is that the direction of movement of material transported by a pair of Archimedes' screws 2 is opposite to the direction of movement of the helical gears 1. In this manner, the direction of expansion of the spiral thread of the Archimedes' screws 2 is opposite to that of the conventional unit shown in FIG. 2, and their direction of rotation can be either the same or opposite, depending on the direction of the extension of the angle of inclination of the screw thread.

More specifically, the material ground by the helical gears 1 is moved towards the right in FIG. 3 by these gears 1 and drops into the compression chamber C2 through the passage C3. Then, by the rotating Archimedes' screws 2, the ground material along with the juice extracted from the ground material is shifted towards the left in FIG. 3 by the spiral ridge of the Archimedes' screws 2. Thus, the material is transferred along a horizontal U-shape path inside the juicer.

Looking at the lower part of the grinding chamber 1, as shown in the right-hand part of the Figure, the lower part of the compression chamber C2, which is connected to the grinding chamber C1 via the passage C3 is shown in the Figure on the left side of the gear housing B. A squeezing screen 3 or numerous squeezing holes are located on the base at the bottom of the compression chamber C2, and the squeezed juice runs downward through the screen 3 along the guide 4.

On the other hand, there is a discharge outlet 5 for the residue remaining after the juice is squeezed out at the bottom of the compression chamber C2, and the front tip of this discharge outlet 5 has a regulating device 6 for controlling the juice-squeezing force. This regulating device 6 adjusts the cross-section of the opening. It may be designed so that the regulating device 6 regulates the juice-squeezing force of the Archimedes' screw 2. However, the most appropriate composition is that of a "regulating device for controlling the juice-squeezing force of a juicer" as specified in this application.

The operation of the juicer of the present device is described below.

After the juicer is put into operation, material is inserted into the hopper H. The material is ground up by means of the helical gear 1 in the grinder C1 and then shifts to the right as shown in the Figure, dropping into the compression chamber C2 via the passage C3.

The material which has dropped into the compression chamber C2 is moved to the left by the pair of Archimedes' screws as shown in the Figure, and the regulating device 6 for controlling the squeezing force that is located in the discharge outlet 5 is compressed by the resulting back pressure. In this manner, the squeezed juice is discharged through the squeezing screen 3 into a glass container (not shown) placed underneath by being guided by the guide 4. After the juice has been squeezed out, the residue is discharged by the rotating Archimedes' screws C2 through the discharge outlet 5 and the regulating device 6 for controlling the squeezing force.

As seen from the above, the juicer of the present invention retains the advantages of the vertically-aligned juicer, which is simple to construct and manufacture and does not require the use of complex juice-squeezing screens. In addition, the juicer can be compact which obviates the use of an unnecessarily long gear housing.

I claim:

1. A juice extractor equipped with a grinding chamber containing a pair of helical gears which grind an inserted material and a compression chamber containing one or more Archimedes' screws which move the ground material and being connected to said grinding chamber by means of a passage, characterized by the fact that:

a direction of movement of said material moved by said Archimedes' screws is opposite to a direction of movement of said helical gear.

2. A juice extractor according to claim 1, wherein a path of movement of said material is U-shaped.

3. A juice extractor according to claim 1, wherein said Archimedes' screws are designed as a mutually interlocking rotating pair.

4. A juice extractor according to claim 1, wherein a bottom of said compression chamber is equipped with a discharge outlet having a regulating device for controlling the squeezing force.

5. A juice extractor equipped with a grinding chamber containing a pair of helical gears which grind inserted materials and a compression chamber containing a pair of Archimedes' screws which move the ground material and being connected to said grinding chamber by means of a passage characterized by the fact that:

a direction of movement of said material moved by said

Archimedes' screws is opposite to a direction of movement of said helical gears, said compression chamber is located underneath said grinding chamber, and said helical gears and said Archimedes' screws are driven by a single motor.

6. A juice extractor according to claim 5, further comprising:

a squeezing screen for extracting liquid which is provided underneath said Archimedes' screws, and an outlet for discharging residue which is provided at an end of said Archimedes' screws.

7. A juice extractor comprising a main body including a driving source and a drive gear chain and a detachable gear housing including a grinding chamber and a compression chamber provided vertically, said grinding chamber containing a pair of helical gears for grinding and moving material in one direction, said compression chamber containing a pair of Archimedes' screws for moving said material ground by said helical gears, and said grinding chamber and said compression chamber being communicated with each other via a passage provided in between, said juice extractor being characterized in that:

a spiral thread of said Archimedes' screws is formed so that a direction of movement of said material by said Archimedes' screws is opposite to said one direction of movement of said helical gears, and said helical gears and said Archimedes' screws are driven by said driving source of said main body.

\* \* \* \* \*